United States Patent
Fung et al.

(10) Patent No.: US 7,019,988 B2
(45) Date of Patent: Mar. 28, 2006

(54) SWITCHING-TYPE POWER CONVERTER

(76) Inventors: Sze Wei Fung, Flat D, 5/F, Skylodge 1, Dynasty Heights 8 Yin Ping Road, Beacon Hill, Kowloon, Hong Kong (CN); Hui Shun Fung, Flat D, 5/F, Skylodge 1, Dynasty Heights 8 Yin Ping Road, Beacon Hill, Kowloon, Hong Kong (CH)

( * ) Notice: Subject to any disclaimer, the term of this patent is extended or adjusted under 35 U.S.C. 154(b) by 211 days.

(21) Appl. No.: 10/707,749

(22) Filed: Jan. 8, 2004

(65) Prior Publication Data
US 2005/0152160 A1 Jul. 14, 2005

(51) Int. Cl.
*H02M 3/335* (2006.01)

(52) U.S. Cl. .................................... 363/21.01; 363/131

(58) Field of Classification Search .................. 363/16, 363/17, 21.01–21.18, 24, 25, 37, 97, 131
See application file for complete search history.

(56) References Cited

U.S. PATENT DOCUMENTS

| | | | | |
|---|---|---|---|---|
| 5,795,595 A | * | 8/1998 | Beeck et al. | 425/198 |
| 5,847,941 A | * | 12/1998 | Taguchi et al. | 363/21.03 |
| 6,301,130 B1 | * | 10/2001 | Aiello et al. | 363/37 |

* cited by examiner

*Primary Examiner*—Jessica Han
(74) *Attorney, Agent, or Firm*—Robert E Malm

(57) ABSTRACT

An apparatus for increasing efficiency and reducing heat dissipation in power converters is disclosed. Zero-voltage-switching (ZVS) can reduce switching loss of power converters but it often results in a very complicated design and only works well under constant output current. In order to allow the ZVS to work over a wide loading range, the transformer secondary current is blocked when the primary starts to resonate. Hence, the resonant voltage waveform across the switch will not change even when the loading current is changing. Such a resonant voltage waveform is obtained with the aid of the transformer primary inductance and capacitor(s). Also provided is a novel driving circuit which controls the switching. Alternatives and variations of this apparatus can be made to satisfy different applications such as power conversion and power inversion. The subject power converter significantly lowers the heat loss and achieves higher efficiency for very wide loading ranges.

18 Claims, 11 Drawing Sheets

SWITCHING-TYPE POWER CONVERTER

BACKGROUND OF INVENTION

This invention relates to switching-type power converters and in particular to the reduction of power loss and heat dissipation of such converters over a wide load range of operation.

Power converters can be divided into linear type and switching type. The switching converter has the great advantages of light weight, small size and greater efficiency compared with the linear converter.

A typical dc-dc switching converter circuit such as the one shown in FIG. 1 receives input power from input terminals 24, 26 and produces a switching waveform across the primary winding 28 of transformer 32. The electric power entering primary winding 28 is coupled to secondary winding 30 which feeds the power to a rectifying circuit which in turn outputs converted power to load 38.

The basic forward converter topology shown in FIG. 1 is probably the most widely used topology for powers under 300 W. Input capacitor 20 compensates for the inductance of the cable supplying the input dc power at nodes 24, 26.

When switch 40 is turned on by pulse generator 34, the dot end of secondary winding 30 of transformer 32 goes positive with respect to its no-dot end. Diode 42 is forward-biased, and current flows out to lowpass filter 44, 48. The lowpass filter averages the output waveform and diode 46 works like a free-wheeling diode. When switch 40 turns off, the magnetizing energy stored in transformer 32 is reset by reset circuit 36.

A large portion of the power loss and heat dissipation is due to the switching loss of switch 40 (e.g. FET). This switching loss results from the overlapping of non-zero voltage and current waveforms during the switching transient.

In order to reduce the switching loss, the switching transient time and switching frequency should be reduced. But these techniques have some drawbacks. Using a low switching frequency will lead to larger magnetic components such as a larger transformer and a larger inductor. And when the switching transient becomes very fast, the current slope (di/dt) and voltage slope (dv/dt) will become very large and may cause serious noise problems.

One possible way of reducing the switching loss is the zero-voltage switching method. In practice, the zero-voltage switching method is not completely satisfactory in commercial power conversion products. In order to perform the zero-voltage switching function, a special IC or many more components are usually required, thereby increasing the size and production cost of the power converter. In practice, in order to design a resonant path, some bulky passive components are used (such as a large choke) that increase the size and conduction loss of the converter.

Because of the complexity of the resonant circuit and the control loop, tedious calculations and computer simulations are usually needed. This complicates product design and production. For example, a phase-modulated full-bridge topology can be designed to achieve zero-voltage switching only for a narrow band of output loading. When operated outside of its narrow loading range, it enters the hard-switching mode that greatly increases the heat loss. In general, designing a reliable zero-voltage switching circuit that can cover a wide loading range is very difficult. Thus, there is a continuing need to improve the zero-voltage switching method.

DETAILED DESCRIPTION

The preferred embodiment of the invention consists of (1) loading-independent zero-voltage switching (LIZVS) circuit, (2) pulse width extension tracking (PWET) circuit, and (3) current ripple cancellation (CRC) circuit.

Figure 2:
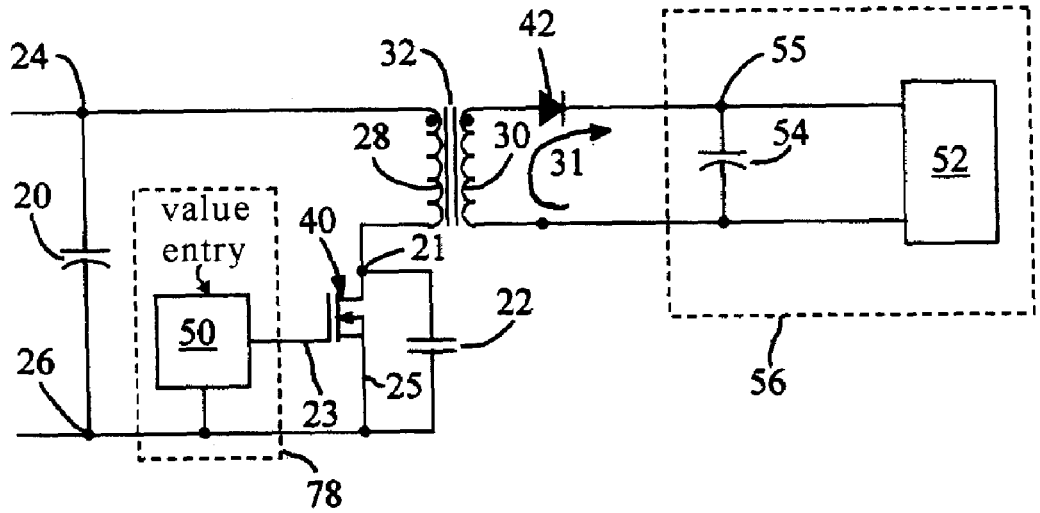
FIG. 2 is a simplified diagram showing an example of connections using a fixed-frequency driver and a resonant capacitor across the switch.
Figure 3:
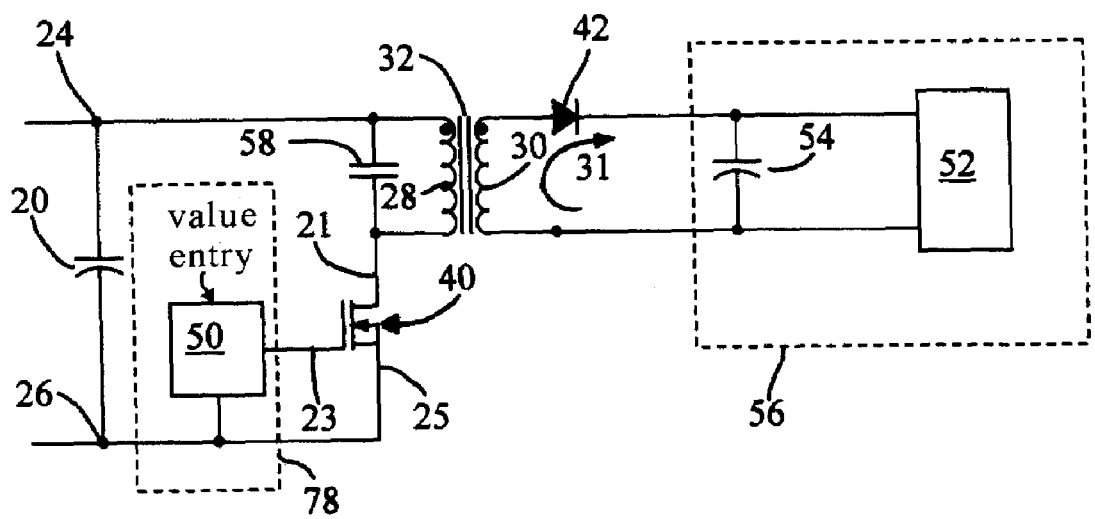
FIG. 3 is a simplified diagram showing an example of connections using a fixed-frequency driver and a resonant capacitor across the primary winding of a transformer.

The LIZVS circuit is shown in FIG. 2. Zero-voltage switching is used to reduce the switching loss. The resonant elements are primary winding 28 of transformer 32 and capacitor 22. The capacitor can be connected alternatively across transformer primary winding 28 as shown in FIG. 3.

In order to make the resonant characteristic independent of the loading current, current flow through transformer secondary winding 31 is blocked by the reverse biasing of diode 42 when the primary winding 28 and capacitor 22 resonate. Consequently, there is no secondary current to affect the inductance of primary winding 28.

Input nodes 24 and 26 (reference) connect to input capacitor 20. Pulse generator 50 drives switch 40. When switch 40 turns on, current flows through primary winding 28 of transformer 32 and bypasses capacitor 22, thereby coupling power to secondary winding 30 of transformer 32. Diode 42 and capacitor 54 convert the ac signal induced in secondary winding 30 to a dc output. The power is delivered directly to load 52.

When switch 40 turns off, the flowing input current charges capacitor 22. The voltage across switch 40 rises slowly compared with the current drop through the switch.

Hence, the turn-off loss is greatly reduced. The voltage across switch 40 starts to resonant with the frequency determined by the values of the inductance of primary winding 28 and the capacitance of capacitor 22. During resonance, diode 42 is reverse biased so that there is no current passing through secondary winding 30. Hence, the inductance of primary winding 28 remains constant during resonance.

When the voltage across switch 40 decreases and reaches zero, switch 40 is turned on again by a positive drive voltage on gate 23. Since the voltage across switch 40 is zero, the turn on switching loss is theoretically zero. After switch 40 is turned on, the resonance ends because switch 40 short-circuits the capacitor. And secondary winding 30 output current begins to flow again. In this manner, the switching loss of switch 40 is greatly reduced.

Pulse generator 50 may include a value-entry device which allows a user to specify the switch-off repetition rate or alternatively the switch-on time duration.

Figure 9:
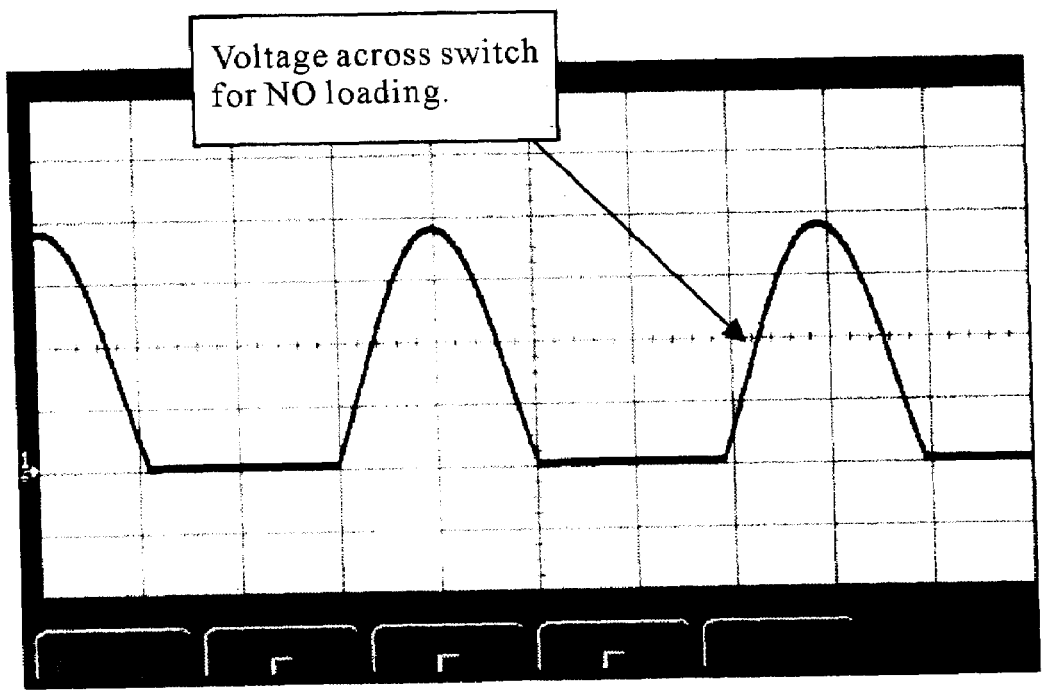
FIG. 9 shows the voltage across the switch of the converter for no-loading current.
Figure 10:
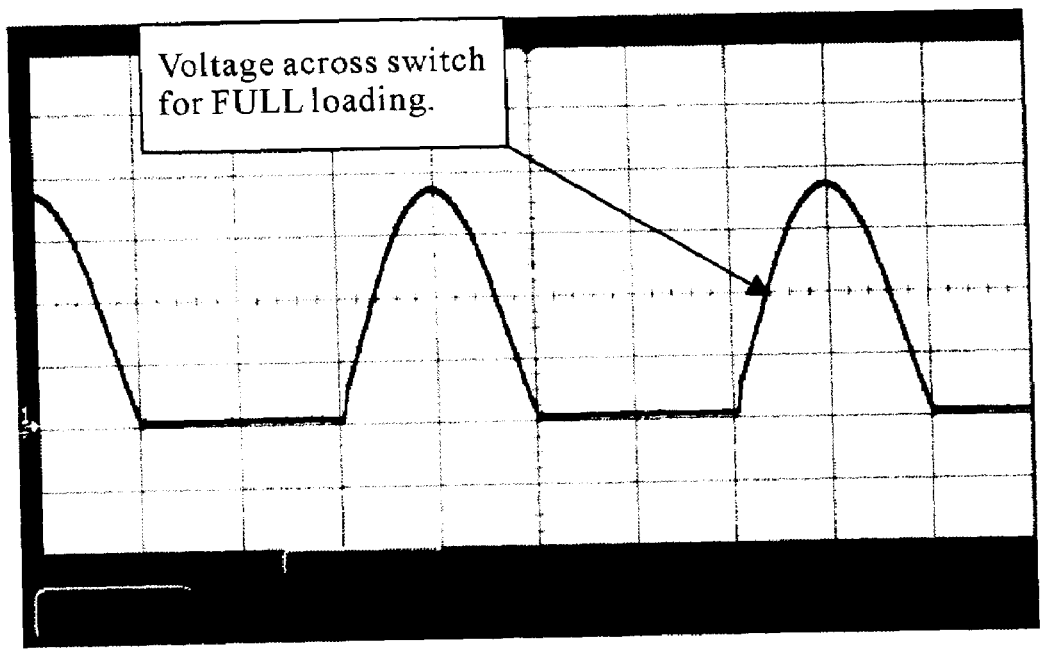
FIG. 10 shows the voltage across the switch of the converter for full-loading current.

FIG. 9 shows the voltage across switch 40 for no-loading current during resonance of primary winding 28 and capacitor 22. FIG. 10 shows the voltage across switch 40 for full-loading current during resonance. FIGS. 9 and 10 illustrate that the amplitude and frequency of the voltage across switch 40 during resonance is independent of the loading current.

The switching transformer 32 plays two roles in this invention. One is to couple the power from input to output and the other is to act as an inductor. When diode 42 is forward biased, transformer 32 couples the power. Transformer 32 becomes an inductor when diode 42 is reverse biased. Hence, no additional bulky inductor is needed to generate a resonant waveform. Moreover, the voltage across and current through capacitor 22 have sine-wave patterns that reduce the electromagnetic interference.

According to this invention, the resonant characteristic is independent of the loading current and has the following merits: (1) The switch 40 is subject to zero-voltage switching over a very wide loading range; (2) Very flexible combinations of circuits: e.g. control stage 78 and output stage 56; (3) Fixed switching frequency can be used; (4) Fixed switching duty cycle can be used; (5) No need to add a large inductor for resonance; (6) Output inductor is not necessary; (7) No snubber circuit is needed; (8) Low EMI.

Figure 8:
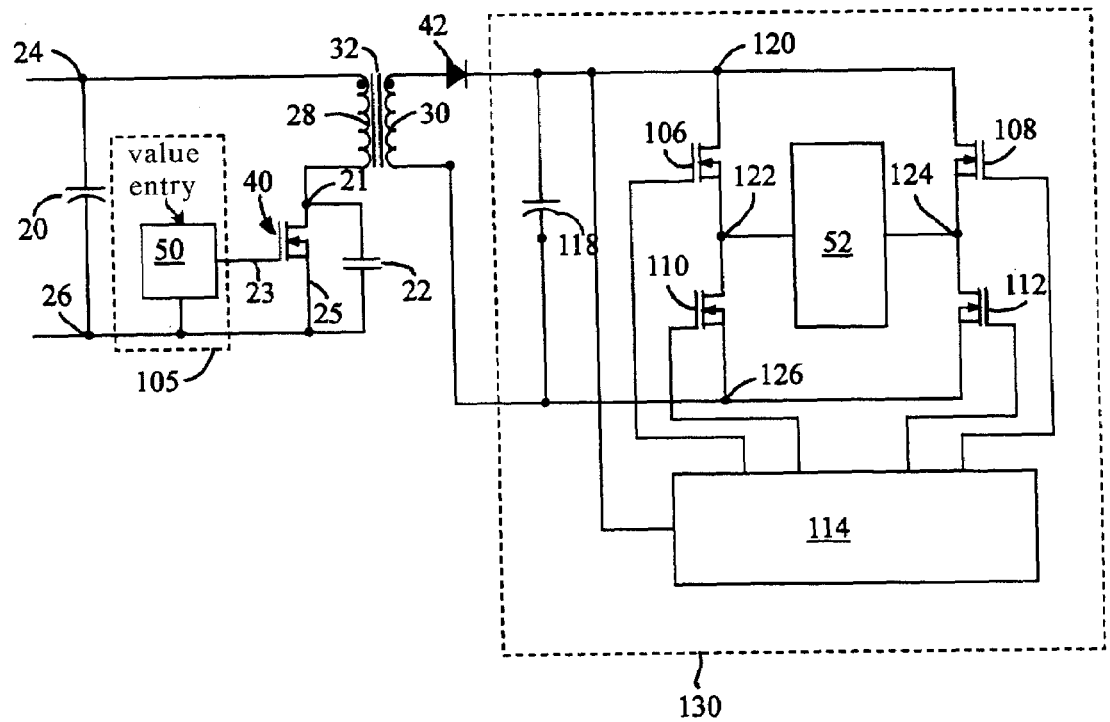
FIG. 8 is a simplified diagram showing the use of a full bridge circuit in obtaining a regulated root-mean-square ac output.

FIG. 8 shows an output stage 130 using a full-bridge dc-ac topology. The dc-voltage available from capacitor 118 is applied to the bridge consisting of MOSFET switches 106, 108, 110, and 112. Controller 114 alternately turns on switch pair 106, 112 and switch pair 108, 110, thereby causing current to flow periodically through load 52 in alternate directions. This arrangement can provide a regulated root-mean-square (rms) ac output by utilizing a pulse width modulation (PWM) controller. PWM controller 114 regulates the output rms voltage by controlling the duty cycle of switches 106, 108, 110, and 112.

Figure 1:
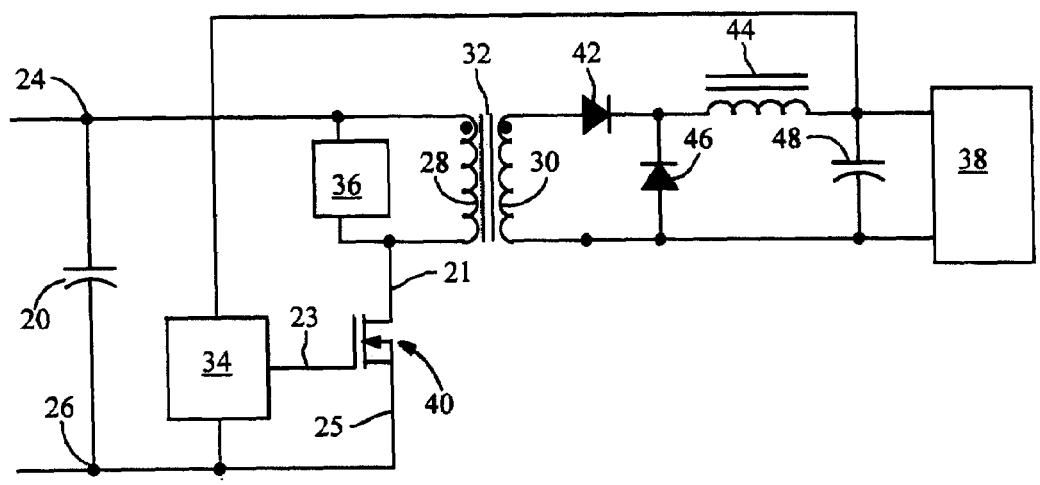
FIG. 1 is a schematic of a typical switching-type power supply circuit currently used in dc-dc conversion circuits.
Figure 14:
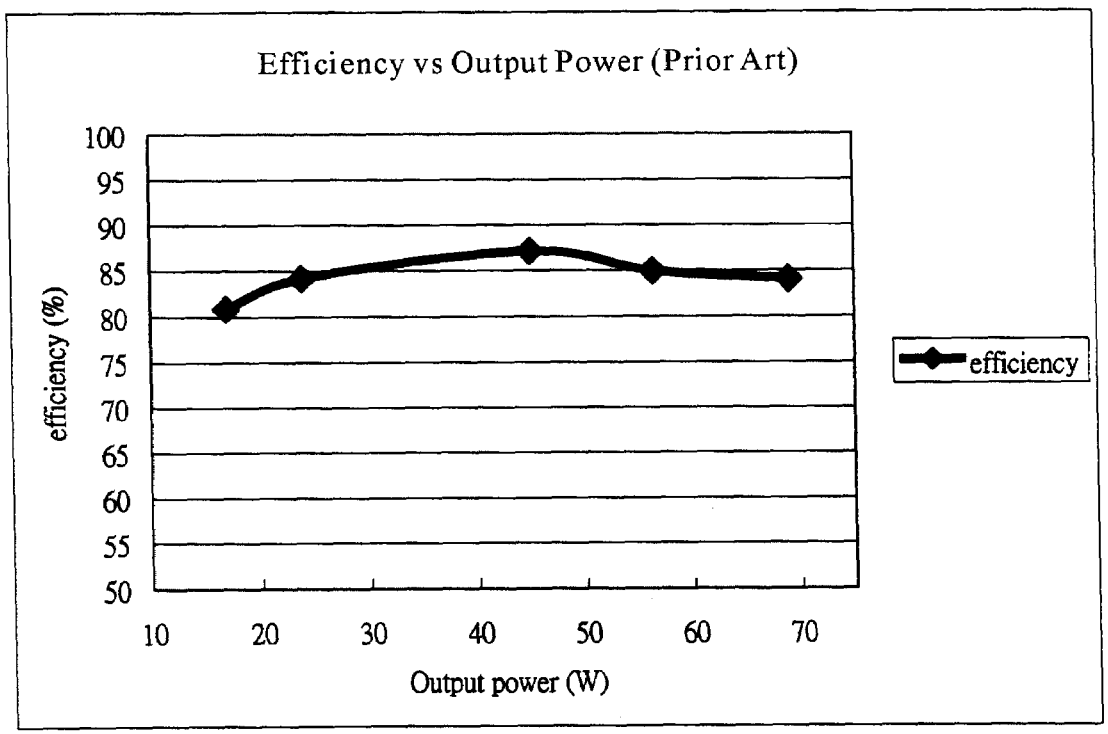
FIG. 14 shows the efficiency of a 75-W inverter based on the topology of FIG. 1.
Figure 15:
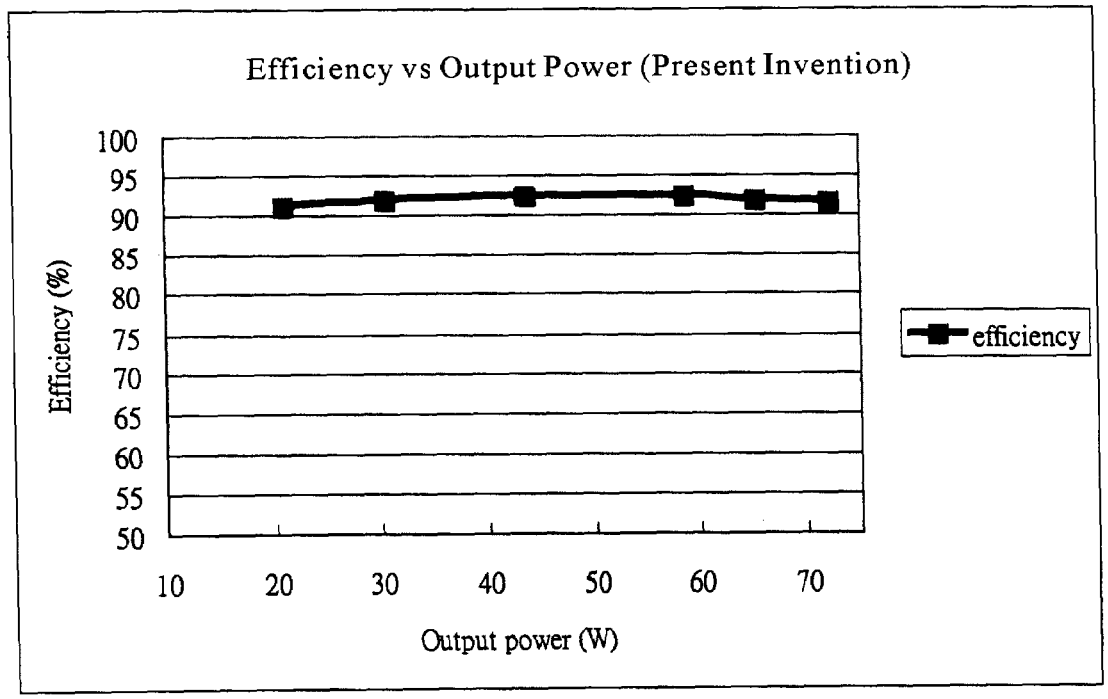
FIG. 15 shows the efficiency of a 75-W inverter based on the topology of FIG. 8.

Tests of two power inverters illustrate the high-efficiency of this invention. The first inverter uses the conventional forward converter topology (similar to FIG. 1). Its rated power is 75 W and the result is shown in FIG. 14. The second inverter uses the circuit of FIG. 8 which embodies the principles of this invention. Its rated power is also 75 W and the result is shown in FIG. 15. FIGS. 14 and 15 illustrate the improvement in efficiency that can be realized with the present invention.

Figure 4:
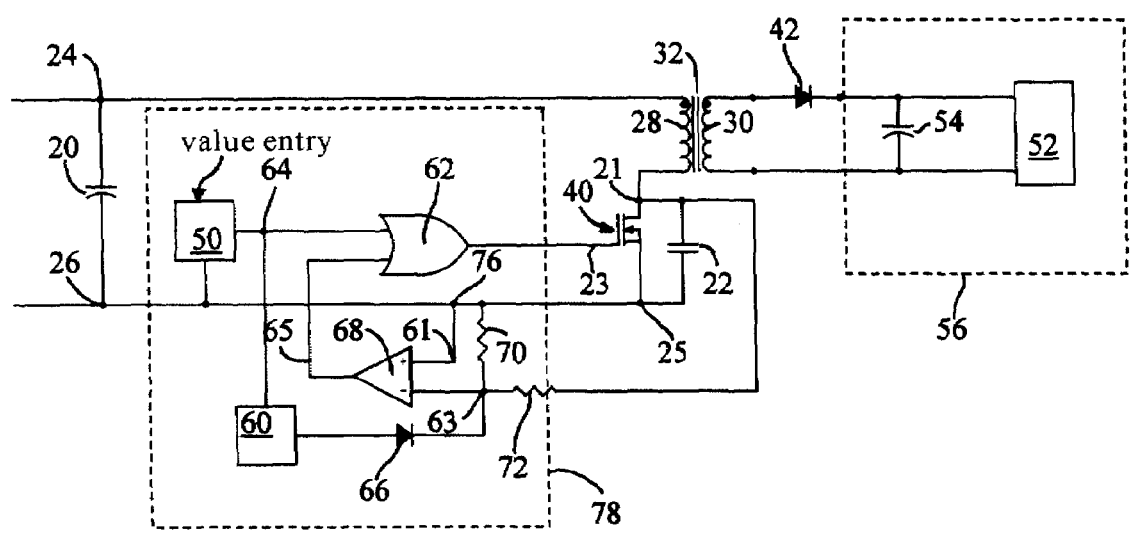
FIG. 4 is a schematic diagram showing the use of a pulse width extension tracking (PWET) circuit to track the zero-voltage switching point.

Switch 40 of FIGS. 3 and 4 can easily be controlled by a fixed-frequency signal generated, for example, by a simple self-oscillating pulse generator. The pulse-width extension tracking (PWET) circuit, a zero-voltage tracking circuit, provides a more precise control signal or even a variable-frequency control signal.

FIG. 4 shows the PWET circuit 78 used to control the LIZVS circuit discussed above. It senses the voltage across the switch 40. When the switch turns off, the voltage across capacitor 22 first increases and then decreases to zero. When the voltage reaches zero, the PWET circuit lets the switch turn on again. The switching frequency is determined by the setting of the pulse repetition rate of pulse generator 50 as part of the design process or by the user entering a value via the value-entry port.

Pulse generator 50 operates at a specified frequency and a narrow pulse width. The pulse signal is supplied to pulse shaper 60 and OR gate 62. The output of OR gate 62 drives switch 40. Comparator 68 senses the voltage across switch 40. When the voltage goes to zero, the comparator output goes high. The output of comparator 68 is fed into OR gate 62. OR gate 62 output is high if either of its inputs is high. As a consequence, the pulse out of OR gate 62 corresponds to the pulse of pulse generator 50 extended in width into the past by overlap with the pulse from comparator 68.

In order to prevent circuit latch-up, pulse shaper 60 provides a signal to comparator 68 to turn it off when pulse generator 50 outputs a high signal. The trailing edge of the pulse produced by pulse shaper 60 prevents comparator 68 from reacting to the initial zero voltage across switch 40 when the pulse from pulse generator 50 ends and switch 40 is turned off.

Figure 5:
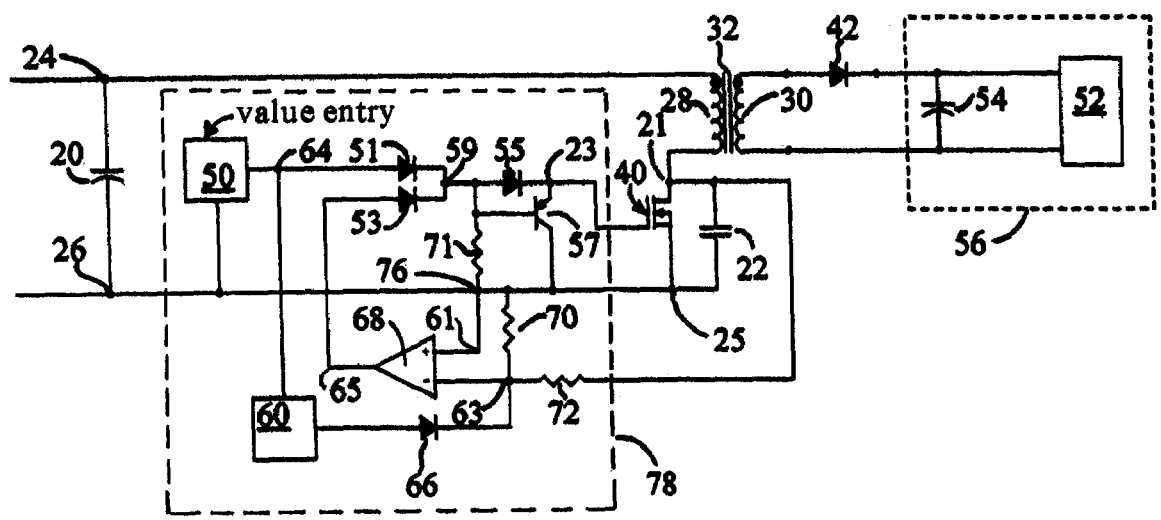
FIG. 5 shows an embodiment of the invention using diodes and a transistor to perform the OR gate function in the PWET circuit.

FIG. 5 shows a functionally-equivalent circuit substituted for OR gate 62 in FIG. 4. When either input to diodes 51 and 53 goes high, voltage node 23 also goes high causing switch 40 to turn on. If the inputs to both diodes are zeros, transistor 57 turns on, voltage node 23 discharges to ground through the transistor, and switch 40 turns off.

Figure 6:
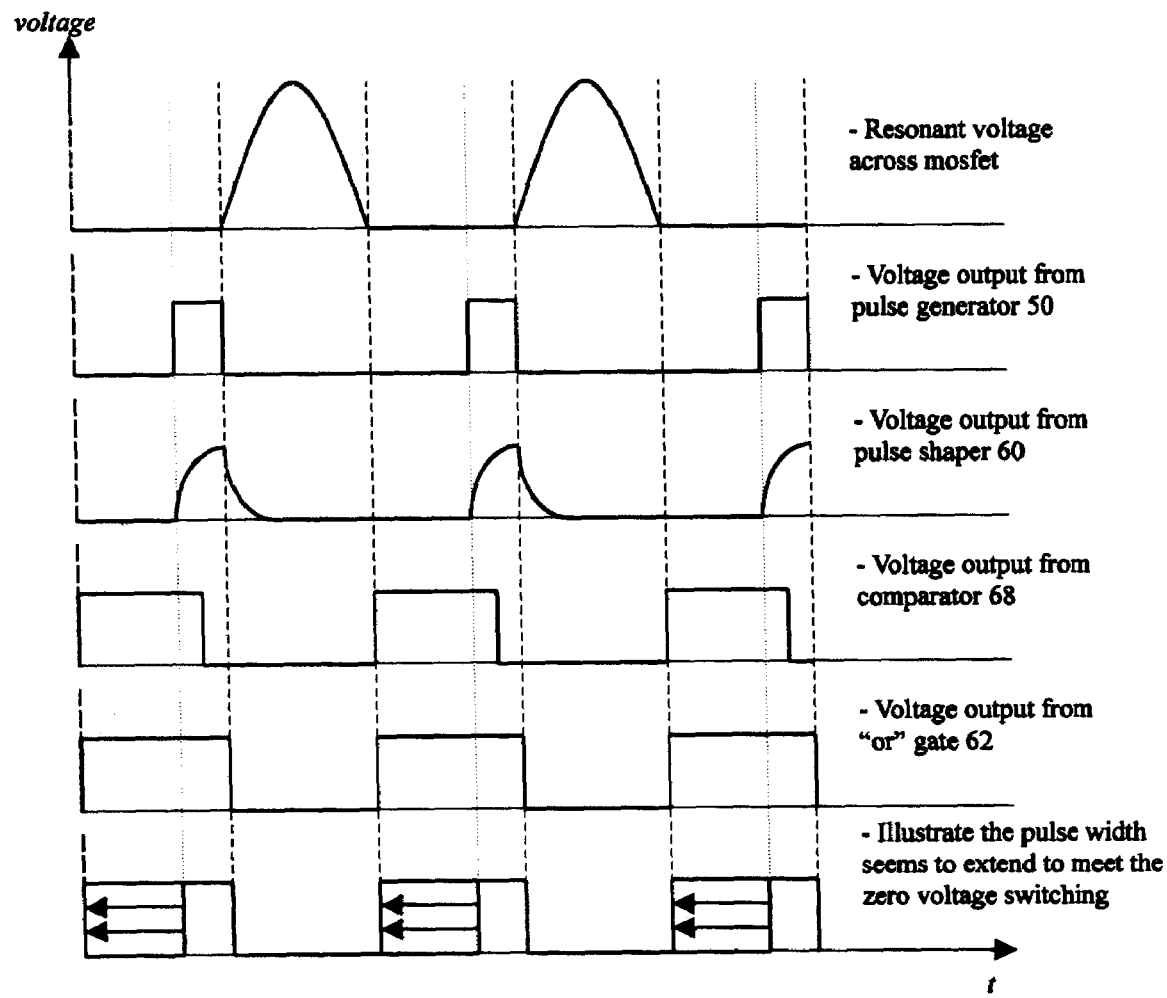
FIG. 6 shows the schematic waveforms for the PWET circuit.

FIG. 6 shows the waveforms of the PWET circuit. It illustrates that the pulse output from pulse generator 50 seems extended into the past to the zero-voltage switching point.

Figure 11:
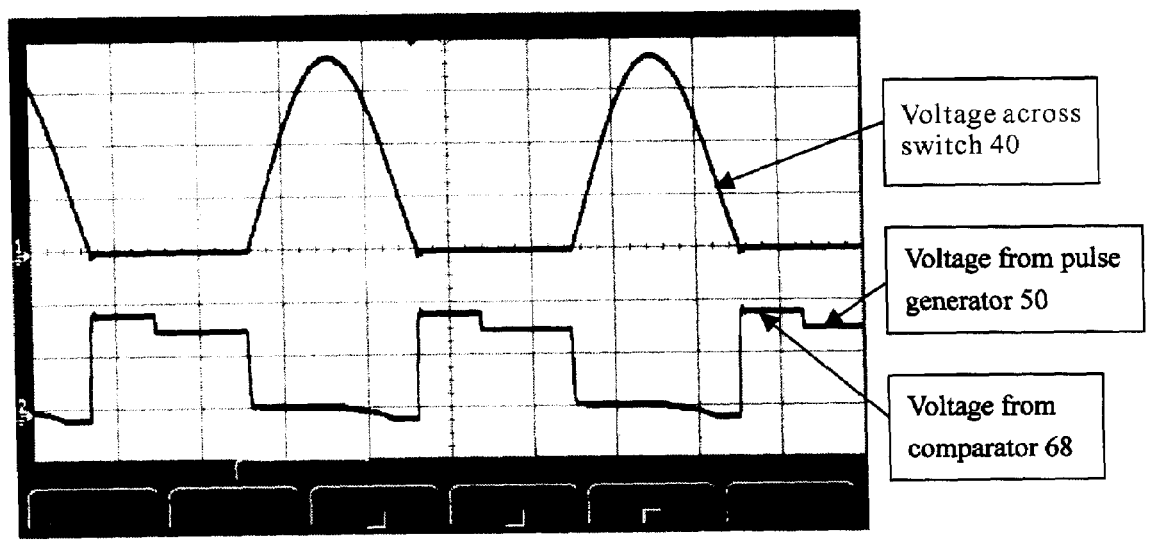
FIG. 11 shows the measured gate voltage and the voltage across the switch for the converter of FIG. 5.

FIG. 11 shows the measured voltage across switch 40 (upper trace) and the voltage at node 23 (lower trace) for the circuit configuration of FIG. 5. In order to provide a better understanding, a slightly lower voltage is used to represent the pulse coming from pulse generator 50.

In summary: (1) Switch 40 is closed by the high output of comparator 68; (2) Switch 40 is opened by the low output of pulse generator 50; (3) The pulse output by pulse shaper 60 terminates the high output of the comparator; (4)If there were no pulse shaper 60, the circuit would latch up as follows: (a) comparator 68 going high followed by (b) OR gate 62 going high followed by (c) switch 40 closing resulting in (d) voltage across switch 40 being zero resulting in (e) comparator 68 going high and remaining high.

The PWET circuit 78 is a particular embodiment of what might be called more generally a "controller". A controller, in the context of the present invention, provides the means for turning switch 40 on and off. The simplest form of a controller is one which periodically supplies a switch-off voltage having a duration equal to one-half the reciprocal of the resonant frequency of primary winding 28 and capacitor 22. When the controller is not supplying a switch-off voltage, it supplies a switch-on voltage. Pulse generator 50 is a particular embodiment of this simplest form of controller.

In the more sophisticated versions of a controller, the voltage across switch 40 is supplied to the controller and the controller supplied voltage changess from the switch-off voltage to the switch-on voltage by examining the voltage across switch 40 (see FIG. 11). The appropriate time to switch from the switch-off voltage to the switch-on voltage is when the switch-40 voltage goes to zero.

A zero switch-40 voltage is easily determined with a comparator which compares the switch-40 voltage with zero and produces a switch-on signal when the switch-40 voltage is substantially equal to a zero reference level. A switch-on signal from the comparator is not sufficient in itself, however, to indicate when the change from the switch-off voltage to the switch-on voltage should occur since the comparator output signal will be produced when the switch-on voltage is being supplied by the controller to switch 40. Thus, some means must be provided for either ignoring the comparator output signal or deactivating the comparator during the time period when the controller is transitioning from the switch-on voltage to the switch-off voltage.

The PWET circuit 78 deactivates the comparator during the time period when the controller is transitioning from the switch-on voltage to the switch-off voltage. Another approach would be to block the switch-on signal from the comparator for a short time interval after the controller switches from the switch-on voltage to the switch-off voltage. Still another approach would be to require the switch-40 voltage to be substantially different from zero prior to allowing the comparator to respond to a zero switch-40 voltage. For example, the reference level for the comparator could be set at a voltage substantially different from zero when the switch is turned off. When the comparator determines that the switch-40 voltage matches the reference level, then the reference level for the comparator is reset to zero.

Figure 7:
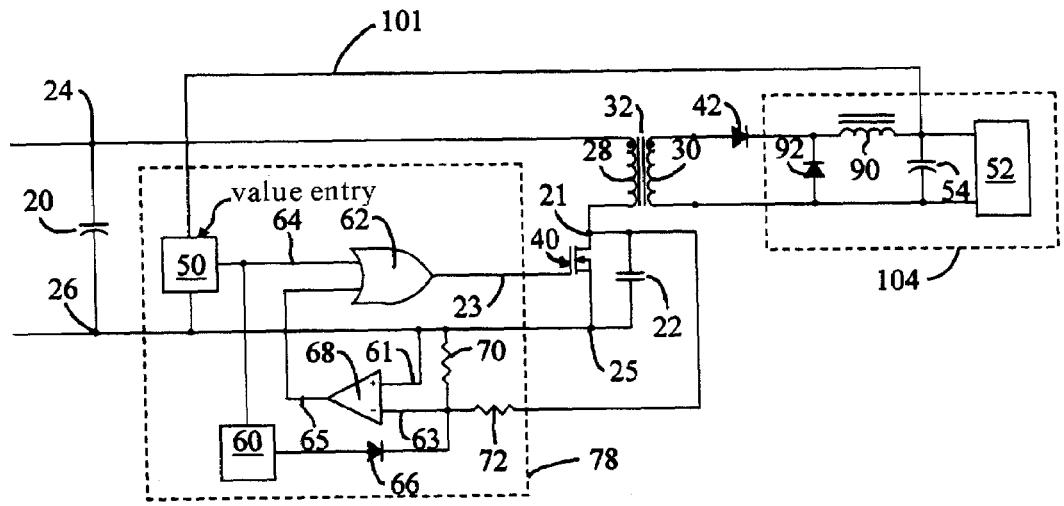
FIG. 7 is a simplified diagram showing an example of connections using a variable-frequency PWET circuit.

FIG. 7 shows an embodiment of the invention wherein the LIZVS converter together with a PWET circuit are used to regulate the output voltage. The waveform issuing from secondary winding 30 and diode 42 is passed through lowpass filter 90, 54 for averaging. Free-wheeling diode 92 keeps the current flowing when diode 42 is reverse biased. The PWET circuit senses the averaged dc output voltage via connection 101. Pulse generator 50 obtains an error signal by differencing voltage 101 and a desired value established within pulse generator 50 by design or entered by the user via the value-entry port. Pulse generator 50 adjusts the switch-on time of switch 40 to obtain a zero error signal thereby maintaining the output voltage at a value equal to the desired value maintained within pulse generator 50.

With this configuration the output voltage is a function of duty cycle. Because the switch-off time must be maintained equal to one-half the reciprocal of the resonant frequency, the switch-on time is the only quantity available for adjustment. Hence, voltage 101 is fed to pulse generator 50 to adjust the switch-on time to regulate the output.

The capacitors used in the power converteral also entail power loss, especially in high-current operations. When current flows in and out of a capacitor at a high frequency, the power loss will be significant. The CRC configuration can reduce the heat dissipation in the capacitors.

The CRC configuration is the combination of at least two LIZVS circuits with each LIZVS circuit working with a switch-on duty cycle no higher than 1/N where N is the number of LIZVS circuits in the combination. Only one LIZVS circuit is in a switch-on state at any one time.

Figure 12:
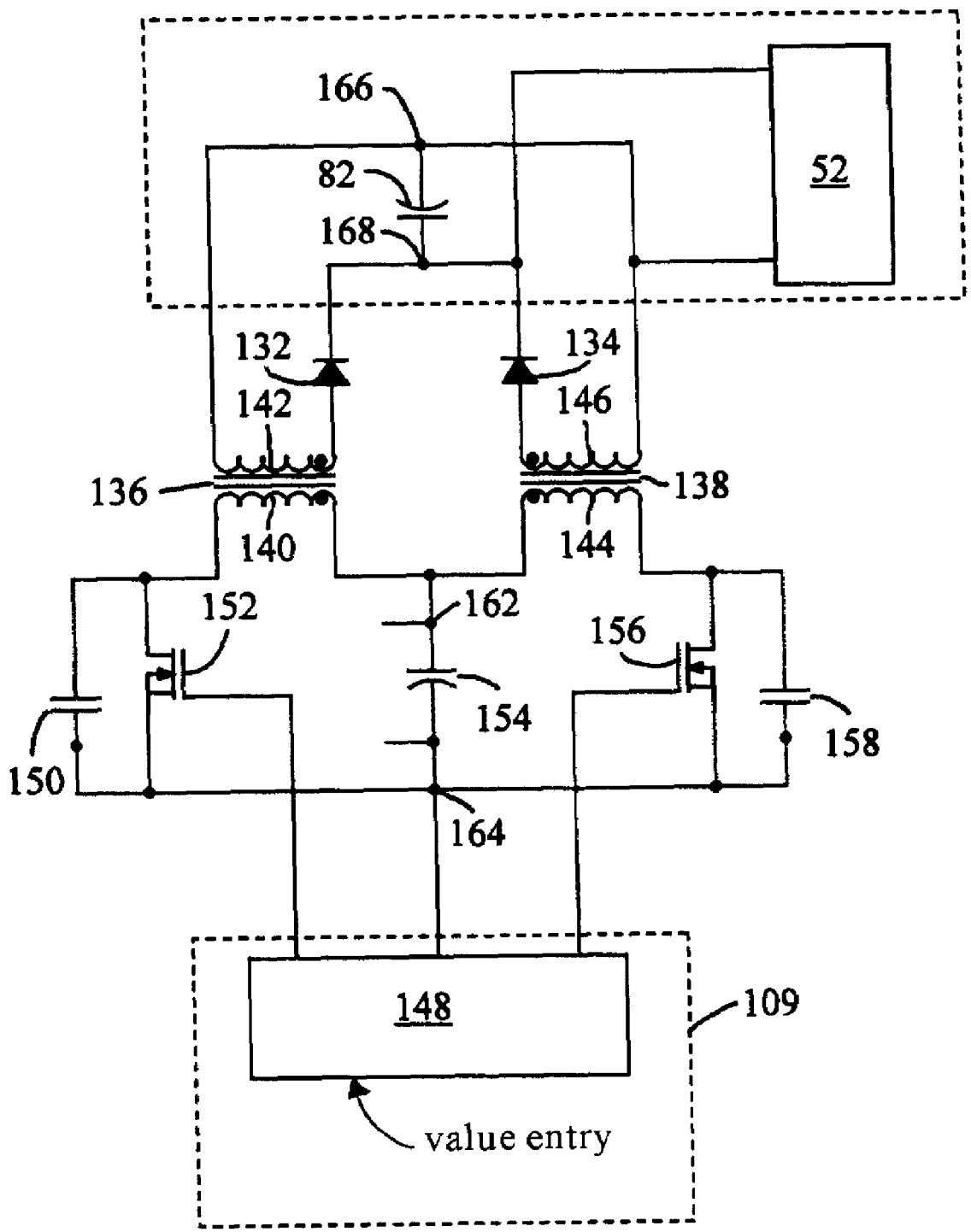
FIG. 12 is a simplified diagram showing the use of a loading-independent zero-voltage switching (LIZVS) circuit and current ripple cancellation (CRC) circuit.

FIG. 12 shows a CRC configuration involving two LIZVS circuits. Input power is supplied at nodes 162, 164. Capacitor 154 is the input capacitor which compensates for the inductance of the cable supplying power to nodes 162, 164. Capacitors 150, 158 and primary windings 140, 144 of transformers 136, 138 constitute the resonant circuits associated with the two LIZVS circuits. Pulse generator 148 alternately supplies a switch-on voltage to primary switches 152, 156. The switch-on times of primary switches 152, 156 do not overlap. The power outputs from transformers 136, 138 can be treated as two separate and distinct voltage sources and can be connected either in parallel or in series. The two LIZVS circuits alternately supply current through secondary windings 132, 146 and diodes 132, 134 to capacitor 82 and load 52.

Figure 13:
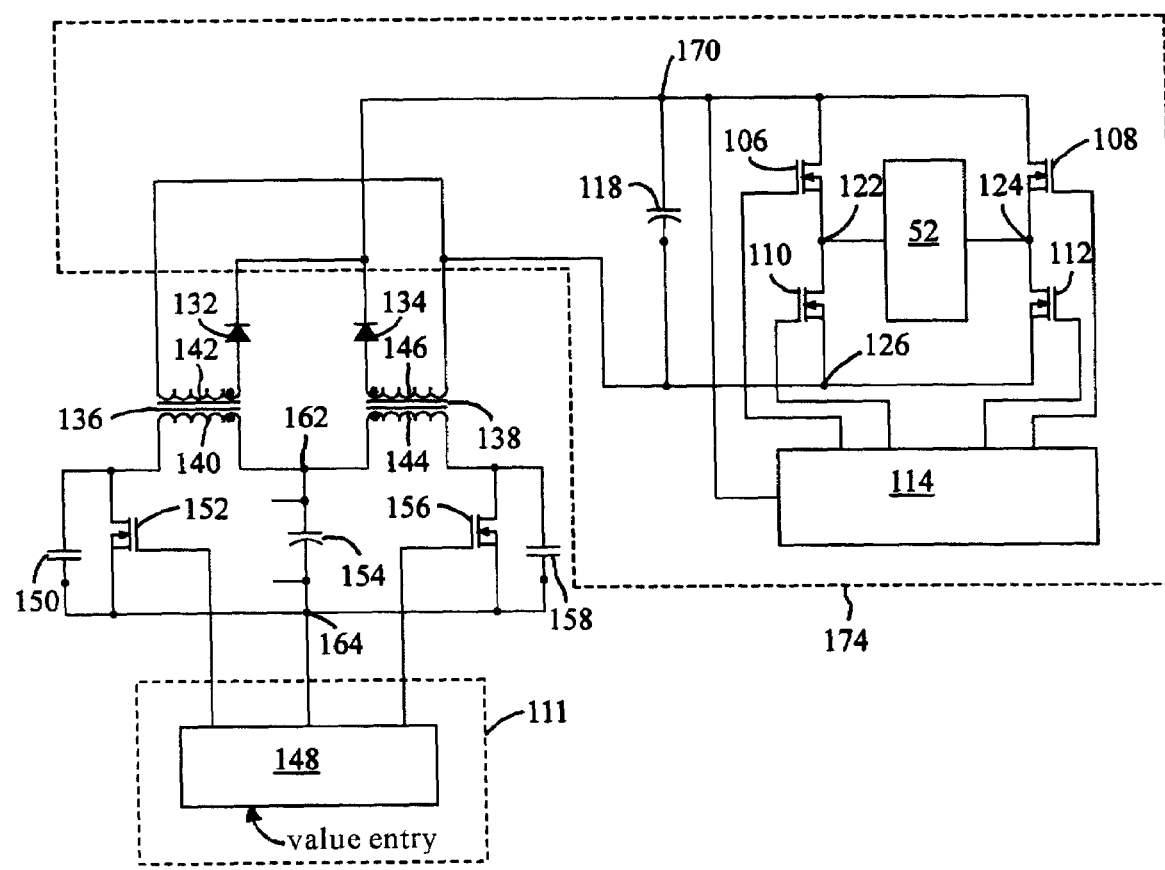
FIG. 13 shows the output stage connecting to a full-bridge dc-ac circuit.

FIG. 13 shows a CRC configuration for a dc-ac power converter utilizing the full-bridge dc-ac circuit of FIG. 8. The configuration is very suitable for dc-ac power inversion because the input voltage is usually low and the input current is usually large. When the CRC circuit is used, the dissipation of input capacitor 154 is greatly reduced.

The invention claimed is:

1. A power converter operating separately or as one of a plurality which supplies power to a load utilizing power from a dc source, only one of the plurality of power converters supplying current to the load at any one time, the power converter consisting of:

a transformer having a primary winding and a secondary winding, one end of the primary winding terminating in a power terminal and the other end in a reference terminal;

a primary switch having a switched terminal, a reference terminal, and a control terminal, the primary switch being off and the switched terminal being disconnected from the reference terminal when a switch-off voltage is applied to the control terminal, the primary switch being on and the switched terminal being connected to the reference terminal when a switch-on voltage is applied to the control terminal, the switched terminal being connected to the reference terminal of the primary winding, power being applied to the power converter by connections to the power terminal of the primary winding of the transformer and the reference terminal of the primary switch, the secondary winding of the transformer being the source of output power from the power converter;

a capacitor connected in parallel with either the primary winding or the primary switch;

a current blocker connected in series with the secondary winding of the transformer, the current blocker preventing the flow of current through the secondary winding when the primary switch is off;

a means for interfacing the power converter with a load, the means comprising a first electrical conductor connected to the secondary winding of the transformer and a second electrical conductor connected to the current blocker;

a controller having a plurality of terminals comprising a voltage output terminal and a reference terminal, the voltage output terminal being connected to the control terminal of the primary switch and the reference terminal being connected to the reference terminal of the primary switch, the controller alternately supplying the switch-off voltage and the switch-on voltage at the voltage output terminal.

2. The power converter of claim 1 wherein the controller includes a first control terminal, the controller utilizing the voltage appearing on the first control terminal to determine when to change the voltage on the voltage output terminal from the switch-off value to the switch-on value, the first control terminal being connected to the switched terminal of the primary switch.

3. The power converter of claim 2 wherein the controller changes voltages when the voltage on the switched terminal equals the voltage on the reference terminal after being either higher or lower than the voltage on the reference terminal.

4. The power converter of claim 2 wherein the controller changes voltages when the voltage on the switched terminal equals the voltage on the reference terminal after the voltage on the voltage output terminal has been changed from the switch-on value to the switch-off value.

5. The power converter of claim 1 wherein the controller includes a value entry device for use in entering a value into the controller, there being a one-to-one association between a value enterable by means of the value entry device and the primary switch "on-time", the controller causing the primary switch "on-time" to have the value associated with the value entered via the value entry device.

6. The power converter of claim 5 wherein the enterable value is the "on-time" repetition rate.

7. The power converter of claim 5 wherein the enterable value is a voltage value, the controller including a second control terminal, the controller adjusting the primary switch "on-time" until the voltage appearing on the second control terminal equals the value entered via the value entry device.

8. The power converter of claim 7 wherein the output voltage of the power converter is applied to the second control terminal.

9. The power converter of claim 1 wherein the current blocker is a diode, the diode being reverse-biased when the secondary winding and the diode are connected to a load and the primary switch is off.

10. The power converter of claim 1 wherein the current blocker is a switch, the controller controlling the on/off state of the switch by supplying a control voltage to the switch.

11. The power converter of claim 1 wherein the interfacing means further comprises an output stage having two input terminals and two output terminals, the series combination of the secondary winding of the transformer and the current blocker being connected to the output stage by means of the connection of the two electrical conductors to the two input terminals, the two output terminals providing the means for delivering output power to a load.

12. The power converter of claim 11 wherein the output stage comprises a lowpass filter.

13. The power converter of claim 12 wherein the lowpass filter comprises a capacitor having two terminals which serve as both the two input terminals and the two output terminals.

14. The power converter of claim 12 wherein the output stage comprises a parallel combination of (1) a diode and (2) an inductor and capacitor in series, the two input terminals connecting to the parallel combination, the two output terminals connecting to the capacitor.

15. The power converter of claim 11 wherein the output stage comprises a lowpass filter followed by a dc-ac inverter, the two input terminals providing the input to the lowpass filter, the voltage output from the dc-ac inverter being available at the two output terminals.

16. The power converter of claim 15 wherein the lowpass filter comprises a capacitor.

17. The power converter of claim 15 wherein the dc-ac inverter comprises four switches arranged in a bridge configuration and a bridge controller which controls the opening and closing of the four switches.

18. The power converter of claim 17 wherein the controller regulates the output voltage by varying the duty cycles of the bridge switches.

* * * * *